(12) United States Patent
Oh et al.

(10) Patent No.: US 7,547,337 B2
(45) Date of Patent: Jun. 16, 2009

(54) MULTI DUST-COLLECTING APPARATUS

(75) Inventors: Jang-keun Oh, Gwangju (KR); Hak-bong Lee, Jellanam-do (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 535 days.

(21) Appl. No.: 11/317,453

(22) Filed: Dec. 23, 2005

(65) Prior Publication Data

US 2006/0230714 A1 Oct. 19, 2006

Related U.S. Application Data

(60) Provisional application No. 60/666,093, filed on Mar. 29, 2005.

(30) Foreign Application Priority Data

May 6, 2005 (KR) .................. 10-2005-0038050

(51) Int. Cl.
*B01D 50/00* (2006.01)
(52) U.S. Cl. .............. 55/345; 55/426; 55/424; 55/DIG. 3; 55/418; 15/347; 15/353
(58) Field of Classification Search ............. 55/319, 55/426, 424, DIG. 3, 418, 345; 15/347, 353
See application file for complete search history.

(56) References Cited

U.S. PATENT DOCUMENTS

| 4,322,233 A * | 3/1982 | Sisk ................. 55/426 |
| 6,866,705 B2 * | 3/2005 | Nielsen et al. ........... 96/276 |
| 2002/0046438 A1 * | 4/2002 | Oh ................. 15/353 |
| 2004/0010885 A1 * | 1/2004 | Hitzelberger et al. ......... 15/352 |
| 2004/0231091 A1 | 11/2004 | Oh ................. 15/347 |
| 2005/0252180 A1 * | 11/2005 | Oh et al. ............... 55/345 |

FOREIGN PATENT DOCUMENTS

| CN | 1419885 | 5/2003 |
| CN | 1593322 | 3/2005 |
| EP | 0728435 | 8/1996 |
| GB | 238633 | 8/1925 |
| GB | 2406067 | 3/2005 |
| JP | 2004357767 | 12/2004 |

(Continued)

OTHER PUBLICATIONS

Official Action dated Jun. 15, 2006 issued from the Korean Intellectual Property Office with respect to Korean Patent Application No. 2005-38050 filed on May 6, 2005.

(Continued)

*Primary Examiner*—Duane Smith
*Assistant Examiner*—Dung Bui
(74) *Attorney, Agent, or Firm*—Ohlandt, Greeley, Ruggiero & Perle, L.L.P.

(57) ABSTRACT

A multi dust-collecting apparatus for a vacuum cleaner separating dirt particles from air by taking two steps. The multi dust-collecting apparatus includes a dust-collecting unit to separate dirt particles from the air by using gravity and inertia, and a plurality of cyclones to swirl the air discharged from the dust-collecting unit and separate the dirt particles from the air by using centrifugal force.

15 Claims, 5 Drawing Sheets

FOREIGN PATENT DOCUMENTS

| | | |
|---|---|---|
| KR | 1020020079158 | 10/2002 |
| RU | 2006102978/11 | 2/2007 |
| WO | WO02067750 | 9/2002 |
| WO | WO03030702 | 4/2003 |

OTHER PUBLICATIONS

Extended European Search Report dated Jul. 17, 2006 issued from the European Patent Office in respect to European Patent Application No. 06290098.0 filed on Jan. 16, 2006.

* cited by examiner

MULTI DUST-COLLECTING APPARATUS

CROSS REFERENCE TO RELATED APPLICATIONS

This application claims the benefit of U.S. Provisional Application Ser. No. 60/666,093, filed Mar. 29, 2005 and claims benefit under 35 U.S.C. § 119(a) of Korean Patent Application No. 2005-38050, filed May 6, 2005, the entire contents of both of which are incorporated herein by reference.

BACKGROUND OF THE INVENTION

1. Field of the Invention

The present invention relates to a multi dust-collecting apparatus for a vacuum cleaner, and more particularly, to a multi dust-collecting apparatus that separates and collects dirt from air drawn in a vacuum cleaner by taking multi-steps.

2. Description of the Related Art

As is known, a dust-collecting apparatus for a conventional vacuum cleaner uses a dust-bag. However, the dust bag requires replacement when it becomes full and thus causes inconvenience and unpleasantness to a user. In an attempt to solve this problem, a cyclone dust-collecting apparatus separating dirt from drawn-in air by using centrifugal force has been suggested.

However, since there may occur backflow of dirt particles in the cyclone dust-collecting apparatus, a grill member or a filter is provided at an air discharge port for the purpose of increasing a dust-collection efficiency. An example of the cyclone dust-collecting apparatus is disclosed in the Korean Patent Laid-open No. 2002-0073464. However, because the grill member or the filter is provided at the air discharge port, a pressure loss is increased, which deteriorates a suction force. In order to maintain a suction force, a power of a suction motor has to be increased. However, this causes a high power consumption.

Currently developed multi cyclone dust-collecting apparatuses centrifugally separate dirt from drawn-in air by taking at least two steps. However, the multi cyclone dust-collecting apparatus has a lengthened passage and thus a suction force is lowered.

SUMMARY OF THE INVENTION

The present invention has been developed in order to solve the above problems in the related art. Accordingly, an aspect of the present invention is to provide a multi dust collecting apparatus that is capable of achieving a high dust-collection efficiency and also maintaining a suction force.

The above and/or other aspects are achieved by providing a multi dust-collecting apparatus including a first dust-collector to separate dirt particles from drawn-in air by using a gravity and an inertia, a second dust-collector arranged along a circumference of the first dust-collector to separate minute dirt particles from the air flowing from the first dust-collector using a centrifugal force, a cover unit disposed above the first and the second dust-collectors to guide the air discharged from the first dust-collector towards the second dust-collector and to discharge the air discharged from the second dust-collector to the outside, and a dirt receptacle unit to collect the dirt particles separated from the air in the first and the second dust-collectors.

Preferably, but not necessarily, wherein the first dust-collector includes a first housing forming an exterior contour of the first dust-collector and having a first inlet through which the air flows in and a first outlet through which the air is discharged, a suction pipe to guide an external air towards an inside of the first housing and downwards, and a backflow prevention member disposed in the first housing to prevent a backflow of the collected dirt particles.

Preferably, but not necessarily, the suction pipe penetrates through a center portion of the first housing along an axis of the first housing.

Preferably, but not necessarily, the suction pipe includes a horizontal portion penetrating through the second dust-collector and the first housing of the first dust-collector to guide the external air towards an inside of the first housing, and a vertical portion disposed in parallel to the axis of the first housing and having one end connected with the horizontal portion and the other end connected with the first inlet, the vertical portion to guide the air flowing from the horizontal portion in a lower direction of the first housing.

Preferably, but not necessarily, the backflow prevention member has an opening of a predetermine diameter to allow the vertical portion of the suction pipe to pass therethrouh, and an air passing opening is formed between the backflow prevention member and the vertical portion.

Preferably, but not necessarily, the second dust-collector includes a second housing forming an exterior contour of the second dust-collector, the horizontal portion of the suction pipe penetrating though a center portion of the second housing, and a plurality of cyclones arranged along an inner circumference of the second housing to centrifugally separate minute dirt particles from the air flowing from the first dust-collector.

Preferably, but not necessarily, each cyclone includes a cyclone chamber to centrifugally separate dirt particles from the air flowing from the first dust-collector, a chamber wall disposed between the first and the second housings to form the cyclone chamber, a second inlet to guide the air discharged from the first dust-collector towards the cyclone chamber therethrough, and a second outlet to discharge the air separated from the dirt particles in the cyclone chamber to the outside.

Preferably, but not necessarily, the cover unit includes a cover, air inflow guide channels fluidly communicating with the first outlet of the first dust-collector and the second inlets of the cyclones, air outflow guide channels fluidly communicating with the second outlets of the cyclones, and an air discharge pipe disposed on the cover to collect the air discharged from the respective air outflow guide channels and discharge the collected air to the outside.

BRIEF DESCRIPTION OF THE DRAWINGS

These and/or other aspects of the present invention will become apparent and more readily appreciated from the following description of the embodiment, taken in conjunction with the accompanying drawings of which.

DETAILED DESCRIPTION OF AN EXEMPLARY EMBODIMENT

Hereinafter, a multi dust-collecting apparatus according to an embodiment of the present invention will now be described with reference to the accompanying drawings.

Figure 1:
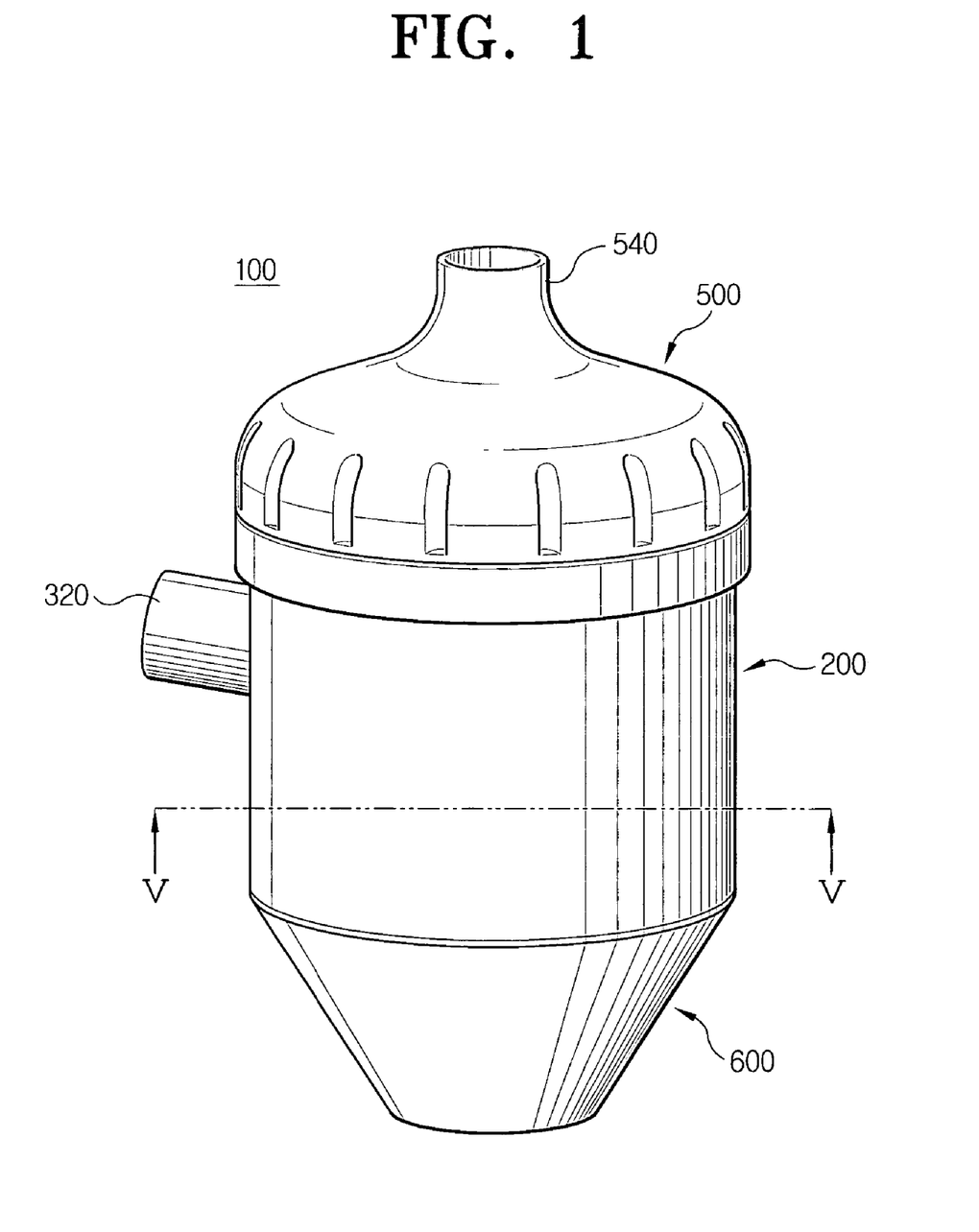
FIG. 1 is a perspective view showing an appearance of a multi dust collecting apparatus according to an embodiment of the present invention.

Referring to FIG. 1, a multi dust collecting apparatus 100 comprises a dust-collecting unit 200, the shape of which resembles a cylinder, a cover unit 500 disposed on an upper portion of the dust-collecting unit 200, and a dirt receptacle unit 600 disposed under the dust-collecting unit 200. An air suction pipe 320 is disposed at side of the dust-collecting unit 200 to guide an external air towards an inner space of a first dust-collector 300 (see FIG. 3) of the dust-collecting unit 200. The dust-collecting unit 200 separates dirt from the air drawn in through the suction pipe 320 and discharges cleaned air. A discharge pipe 540 is disposed on an upper portion of the cover unit 500 to discharge the air discharged from the dust-collecting unit 200 to the outside therethrough. The dirt receptacle unit 600 collects the dirt separated from the air in the dust-collecting unit 200.

Figure 3:
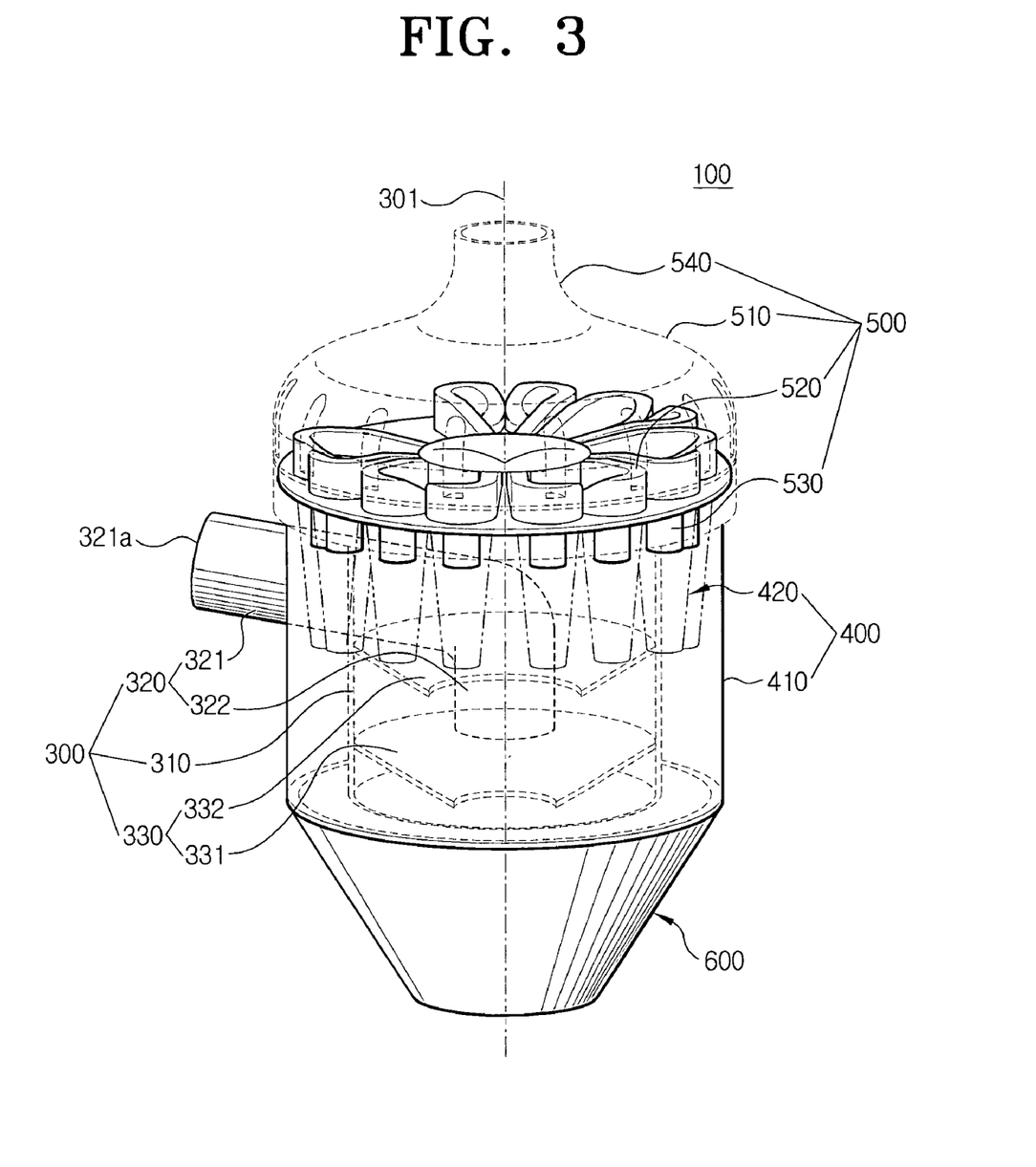
FIG. 3 is a perspective view showing an interior of the multi dust-collecting apparatus of FIG. 1
Figure 4:
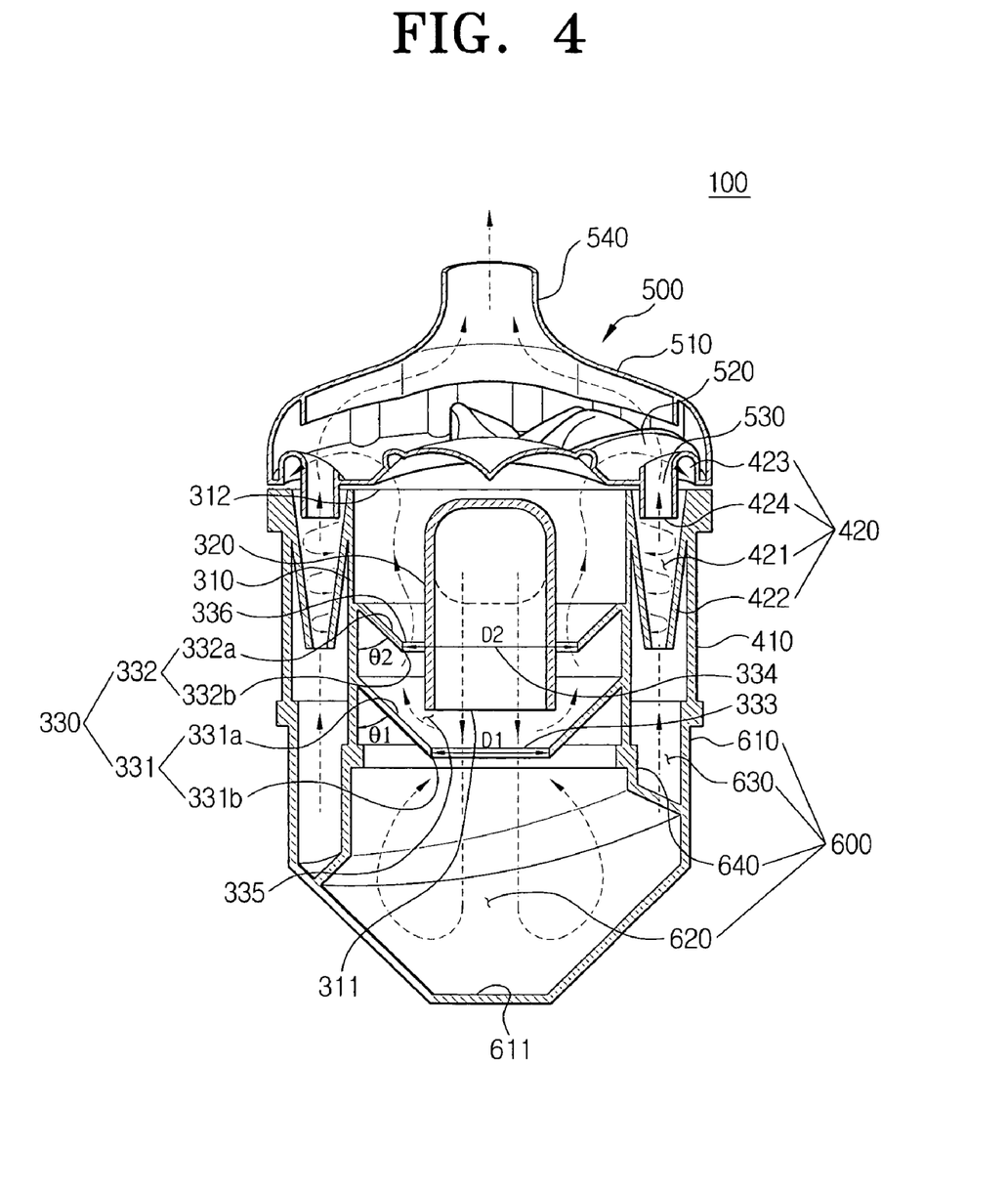
FIG. 4 is a cross section view of FIG. 2 taken along line IV-IV.

Referring to FIGS. 3 and 4, the dust-collecting unit 200 comprises the first dust-collector 300 and a second dust-collector 400. The first dust-collector 300 firstly separates dirt from the drawn-in air by using inertia and gravity. The second dust-collector 400 is arranged around an outer circumference of the first dust-collector 300 and secondly separates minute dirt particles that are not yet separated from the air in the first dust-collector 300, by using centrifugal force.

The first dust-collector 300 comprises a first housing 310, the suction pipe 320 and a backflow prevention member 330.

The first housing 310, the shape of which resembles a cylinder, forms an exterior contour of the first dust-collector 300. The first housing 310 comprises a first inlet 311 through which the air flows into the first housing 310 from the suction pipe 320 and a first outlet 312 through which the air is discharged to the outside of the first housing 310.

The suction pipe 320 has a curved shape such that the suction pipe 320 has a horizontal portion 321 and a vertical portion 322. A part of the horizontal portion 321 protrudes from a second housing 410 of the second dust-collector 400, and the rest part of the horizontal portion 321 penetrates through the second housing 410 of the second dust-collector 400 and the first housing 310 of the first dust-collector 300. The vertical portion 322 fluidly communicates with the horizontal portion 321 and extends downwards and towards the dirt receptacle unit 600 in parallel to a common axis 301 of the second housing 410 and the first housing 310. An air suction port 321a is formed at the horizontal portion 321 to guide the air into the multi dust-collecting apparatus 100. In another embodiment, the air suction port 321a is directly formed on the second housing 410. The vertical portion 322 is connected to the first inlet 311 to guide the air passed through the suction pipe 320 into the first housing 310.

Figure 2:
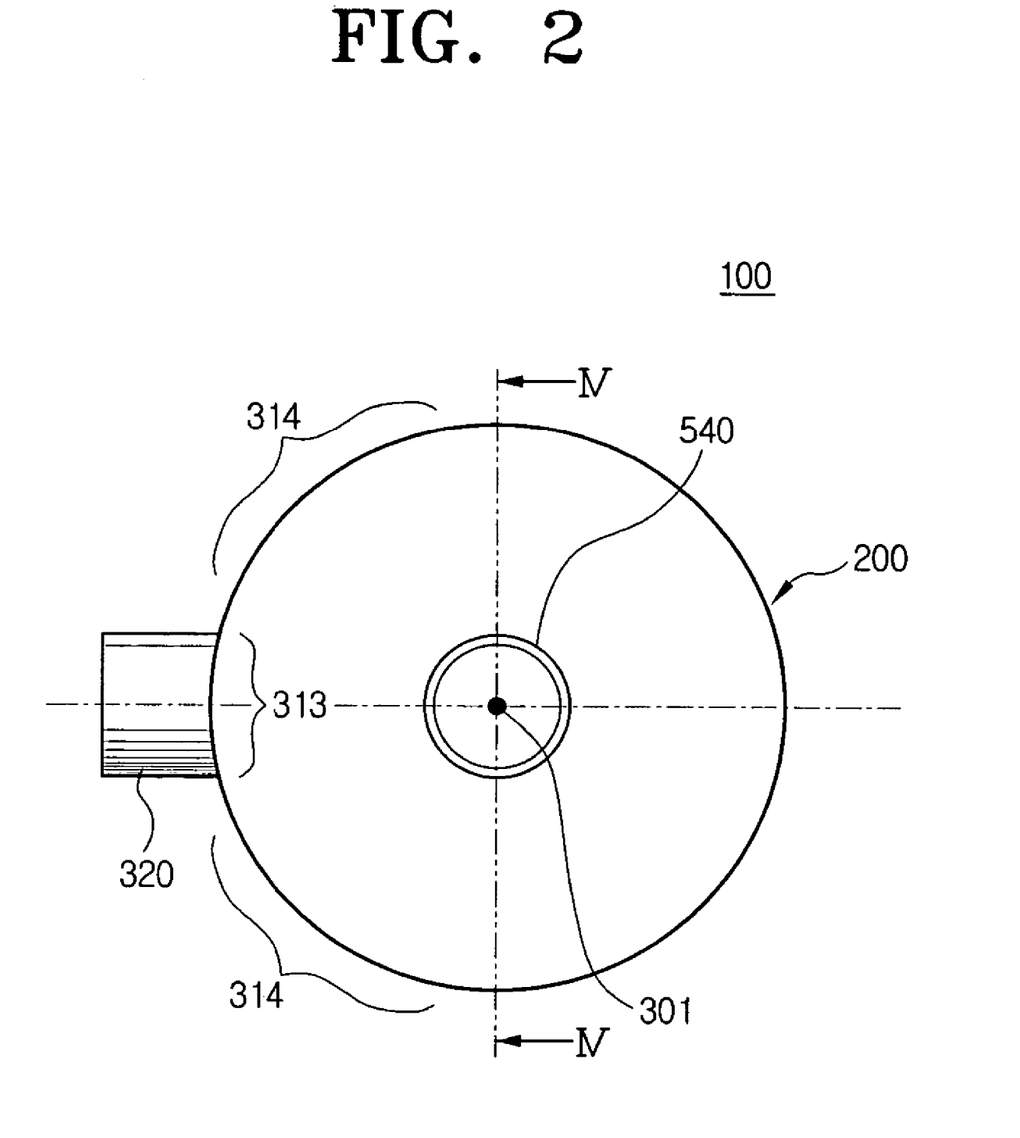
FIG. 2 is a top plan view of FIG. 1.

As described above, the suction pipe 320 downwardly directs the dirt-laden air in the first dust-collector 300. The dirt included in the descending air descends due to gravity and inertia and collides with a bottom surface 611 of the dirt receptacle unit 600, thereby being separated out from the air and collected in a first dust-collecting chamber 620. The air separated from the dirt ascends due to suction force of a suction motor (not shown) disposed in a vacuum cleaner (not shown). Referring to FIG. 2, the suction pipe 320 penetrates through an upper center portion 313 of the first and the second housings 310 and 410 along the axis 301 of the first and the second housings 310 and 410. Unlike a conventional cyclone dust-collecting apparatus, the multi dust-collecting apparatus 100 according to the present invention does not require the suction pipe 310 or an air inflow port to be disposed at an upper side portion 314 of the first housing 310 to generate a centrifugal force. This is because according to the present invention the dirt is separated from the drawn-in air by the gravity and the inertia. Accordingly, there is no limitation to a design of the multi dust-collecting apparatus 100 and, thus, a suction efficiency can be increased.

The backflow prevention member 330 is to prevent the backflow of the dirt collected in the dirt receptacle unit 600. In the illustrated embodiment, a plurality of backflow prevention members 330 having different heights are disposed in the first housing 310.

Each backflow prevention member 330 has one end fixed to an inside surface of the first housing 310 and the other side downwardly inclining towards the dirt receptacle unit 600. It has been determined that if too many backflow prevention members 330 are provided, a suction efficiency may deteriorate, and so, it is preferable to provide about two backflow prevention members, i.e., a first backflow prevention member 331 and a second backflow prevention member 332. In FIG. 3, some parts are cut away from the first and the second backflow prevention members 331, 332 for the convenience of explanations.

The first backflow prevention member 331 is disposed at a lower portion of the first housing 310 to be close to the dirt receptacle unit 600. The first backflow prevention member 331 may be adhered or welded to the first housing 310, or may be integrally formed with the first housing 310. The first backflow prevention member 331 has a first inclination angle $\theta 1$ with respect to the first housing 310 and has a first opening 333 having a predetermine diameter D1. Due to the first inclination angle $\theta 1$, dirt particles piled on an upper surface 331a of the first backflow prevention member 331 slide down to the dirt receptacle unit 600. Meanwhile, a first air passing opening 335 is formed between an end 331b of the first backflow prevention 331 and the vertical portion 322 of the suction pipe 320.

The second backflow prevention member 332 is disposed above the first backflow prevention member 331 and fixed to the first housing 310. Like the first backflow prevention member 331, the second backflow prevention member 332 may be adhered or welded to the first housing 310, or may be integrally formed with the first housing 310. The second backflow prevention 332 has a second inclination angle $\theta 2$ with respect to the first housing 310 and has a second opening 334 having a predetermined diameter D2. Due to the second inclination angle $\theta 2$, dirt particles piled on an upper surface 332a of the second backflow prevention member 332 slide down to the dirt receptacle unit 600. Meanwhile, a second air passing opening 336 is formed between an end 332b of the second backflow prevention member 332 and the vertical portion 322 of the suction pipe 320.

As described above, because of the backflow prevention member 330, the multi dust-collecting apparatus 100 according to the present invention does not require a grill member or filer to prevent the backflow of dirt particles. Accordingly, a structure thereof becomes simplified as compared to prior art devices.

The second dust-collector 400 comprises a cylindrical second housing 410 forming an exterior contour of the second dust-collector 400 and a plurality of cyclones 420 arranged along an inner circumference of the second housing 410. Each cyclone 420 comprises a cyclone chamber 421, a chamber wall 422 forming the cyclone chamber 421, a second inlet 423 and a second outlet 424. The second inlet 423 is disposed at a side of the chamber wall 422 to form a vortex with the air drawn in the cyclone chamber 421. The chamber wall 422 and the cyclone chamber 421 have a reverse-cone figure having a diameter gradually smaller toward one end. The dirt-laden air descends in the cyclone chamber 421 while forming a vortex. The dirt is separated out by being centrifuged and collected in a second dust-collecting chamber 630 of the dirt receptacle unit 600. The air discharged from the first dust-collector 300 passes through the second inlet 423 and the cleaned air separated from the dirt in the cyclone chamber 421 is discharged through the second outlet 424.

Figure 5:
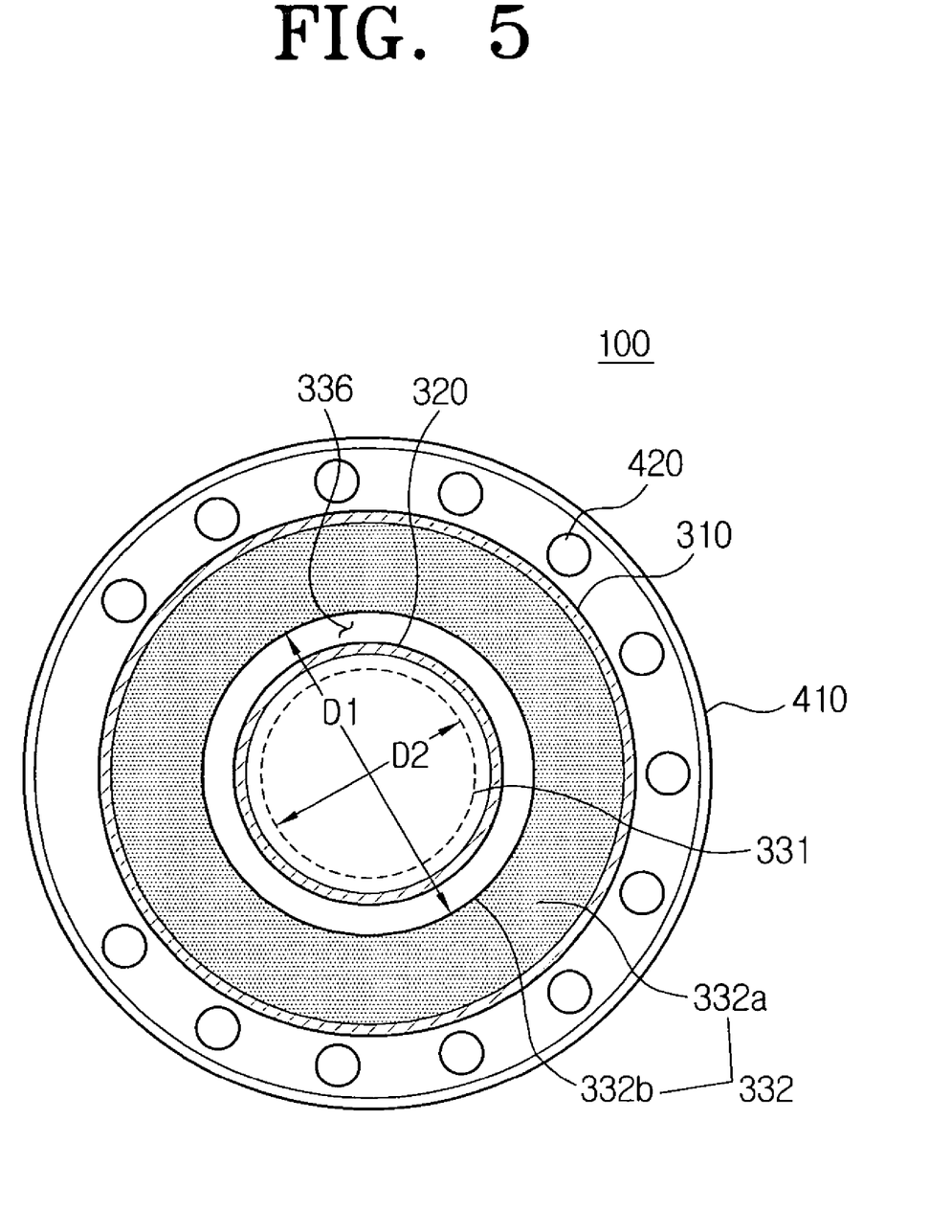
FIG. 5 is a cross section view of FIG. 1 taken along line V-V.

No cyclone 420 is provided at a certain area of the second housing 410 through which the suction pipe 320 penetrates (see FIG. 5).

The cover unit 500 is disposed above the first and the second dust-collectors 300 and 400. The cover unit 500 comprises a cover 510 connected with the second housing 410, air inflow guide channels 520, air outflow guide channels 530 and the air discharge pipe 540 formed on an upper portion of the cover 510. The air inflow guide channels 520 fluidly communicate with the first inlet 312 of the first dust-collector 300 and the second inlets 423 of the cyclones 420. The air outflow guide channels 530 fluidly communicates with the second outlet 424. The cover 510 may be integrally formed with the air inflow guide channels 520 and the air outflow guide channels 530, or may be fabricated separately from them. The air discharge pipe 540 fluidly communicates with the air outflow guide channels 530 and guides the air discharged from the respective cyclones 420 through the air outflow guide channels 530 to the outside of the multi dust collecting apparatus 100. Although in this embodiment the air discharge pipe 540 is disposed at the upper portion of the cover 510, this should not be considered as limiting. The air discharge pipe 540 may be disposed at a side of the cover 510

The dirt receptacle unit 600 collects dirt particles separated out in the first and the second dust-collectors 300 and 400. The dirt receptacle unit 600 has a reverse frustum of a cone figure. For the convenience of removing the collected dirt, the dirt receptacle unit 600 is removably connected with the dust-collecting unit 200. The dirt receptacle unit 600 comprises a body 610 forming an exterior contour of the dirt receptacle unit 600, the first dust-collecting chamber 620 to collect dirt separated out in the first dust-collector 300, the second dust-collecting chamber 630 to collect dirt separated out in the second dust-collector 400, and a partition 640 to divide the first and the second dust-collecting chambers 620 and 630 from each other.

Operation of the multi dust collecting apparatus 100 according to the present invention will now be described with reference to FIG. 4.

When a power is supplied to the vacuum cleaner (not shown), a suction force is generated. By the suction force, dirt-laden air flows into the first dust-collector 300 through the suction pipe 320 and the first inlet 311.

The air drawn in through the suction pipe 320 descends and arrives at the bottom 611 of the first dust-collecting chamber 620. Relatively large dirt particles have the tendency to keep descending due to the inertia and the gravity, so they collide with the bottom surface 611 of the first dust-collecting chamber 620 and are separated from the air.

The air separated from the dirt exits through the first air passing opening 335 and the second air passing opening 336 in sequence. At this time, the air-borne dirt collides with the first and the second backflow prevention members 331 and 332 and thus does not ascend. Rather, the dirt is separated from the air and drops down to the first dust-collecting chamber 620.

The air exiting from the second air passing opening 336 passes through the first outlet 312 and is guided to the air inflow guide channels 520. Then, the air flows into the respective cyclone chambers 421 through the second inlets 423 of the plurality of cyclones 420. Minute dirt particles are separated out by being centrifuged in the cyclone chambers 421 and collected in the second dust-collecting chamber 630 of the dirt receptacle unit 600.

The cleaned air passes through the second outlets 424 of the cyclones 420 and the air outflow guide channels 530 and then is collected in the cover 510 of the cover unit 500. The cleaned air is discharged to the outside of the multi dust-collecting apparatus 100.

As described above, according to the present invention, the relatively large dirt particles are firstly separated out by using the gravity and the inertia and the relative minute dirt particles are secondarily separated out by using centrifugal force. Accordingly, compared to the conventional cyclone apparatus taking both the first and the second steps to separate dirt particles using the centrifugal force, a loss of suction force can be greatly reduced. Therefore, a power consumption can be reduced.

Since the backflow prevention member 330 is provided in the first dust-collector 300 separating the dirt firstly, it prevents the large dirt particles from flowing into the second dust-collector 400. Also, the plurality of cyclones 420 are provided in the second dust-collector 400 so that minute dirt particles collection efficiency can be improved.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A multi dust-collecting apparatus comprising:
    a first dust-collector to separate dirt particles from drawn-in air by using a gravity and an inertia, the first dust-collector having a first housing forming an exterior contour of the first dust-collector and having a first inlet through which the drawn-in air flows in and a first outlet through which the drawn-in air is discharged and a suction pipe to guide an external air towards an inside of the first housing and downwards;
    a second dust-collector arranged along a circumference of the first dust-collector to separate minute dirt particles from the air flowing from the first dust-collector using a centrifugal force;
    a cover unit disposed above the first and the second dust-collectors to guide the air discharged from the first dust-collector towards the second dust-collector and to discharge the air discharged from the second dust-collector to the outside; and
    a dirt receptacle unit to collect the dirt particles separated from the air in the first and the second dust-collectors,
    wherein the suction pipe comprises:
    a horizontal portion penetrating through the second dust-collector and the first housing of the first dust-collector to guide the external air towards an inside of the first housing; and
    a vertical portion disposed in parallel to the axis of the first housing and having one end connected with the horizontal portion and the other end connected with the first inlet, the vertical portion to guide the air flowing from the horizontal portion in a lower direction of the first housing.

2. The multi dust-collecting apparatus as claimed in claim 1, wherein the first dust-collector further comprises:
a backflow prevention member disposed in the first housing to prevent a backflow of the collected dirt particles.

3. The multi dust-collecting apparatus as claimed in claim 2, wherein the suction pipe penetrates through a center portion of the first housing along an axis of the first housing.

4. The multi dust-collecting apparatus as claimed in claim 2, wherein the backflow prevention member has an opening of a predetermine diameter to allow the vertical portion of the suction pipe to pass therethrough, and an air passing opening is formed between the backflow prevention member and the vertical portion.

5. The multi dust-collecting apparatus as claimed in claim 2, wherein the second dust-collector comprises:
a second housing forming an exterior contour of the second dust-collector, the horizontal portion of the suction pipe penetrating though a center portion of the second housing; and
a plurality of cyclones arranged along an inner circumference of the second housing to centrifugally separate minute dirt particles from the air flowing from the first dust-collector.

6. The multi dust-collecting apparatus as claimed in claim 5, wherein each cyclone of the plurality of cyclones comprises:
a cyclone chamber to centrifugally separate dirt particles from the air flowing from the first dust-collector;
a chamber wall disposed between the first and the second housings to form the cyclone chamber;
a second inlet to guide the air discharged from the first dust-collector towards the cyclone chamber therethrough; and
a second outlet to discharge the air separated from the dirt particles in the cyclone chamber to the outside.

7. The multi dust-collecting apparatus as claimed in claim 6, wherein the cover unit comprises:
a cover;
air inflow guide channels fluidly communicating with the first outlet of the first dust-collector and the second inlets of the cyclones;
air outflow guide channels fluidly communicating with the second outlets of the cyclones; and
an air discharge pipe disposed on the cover to collect the air discharged from the respective air outflow guide channels and discharge the collected air to the outside.

8. A multi dust-collecting apparatus comprising:
a first dust-collector to separate dirt particles from drawn-in air by using a gravity and an inertia;
a first housing forming an exterior contour of the first dust-collector;
a suction pipe to guide an external air towards an inside of the first housing and downwards;
a second dust-collector arranged along a circumference of the first dust-collector to separate minute dirt particles from the air flowing from the first dust-collector using a centrifugal force;
a cover unit disposed above the first and the second dust-collectors to guide the air discharged from the first dust-collector towards the second dust-collector and to discharge the air discharged from the second dust-collector to the outside; and
a dirt receptacle unit to collect the dirt particles separated from the air in the first and the second dust-collectors.

9. The multi dust-collecting apparatus as claimed in claim 8, wherein the first dust-collector further comprises:
a first inlet formed in the first housing through which the air flows in and a first outlet through which the air is discharged; and
a backflow prevention member disposed in the first housing to prevent a backflow of the collected dirt particles.

10. The multi dust-collecting apparatus as claimed in claim 9, wherein the suction pipe penetrates through a center portion of the first housing along an axis of the first housing.

11. The multi dust-collecting apparatus as claimed in claim 9, wherein the suction pipe comprises:
a horizontal portion penetrating through the second dust-collector and the first housing of the first dust-collector to guide the external air towards an inside of the first housing; and
a vertical portion disposed in parallel to the axis of the first housing and having one end connected with the horizontal portion and the other end connected with the first inlet, the vertical portion to guide the air flowing from the horizontal portion in a lower direction of the first housing.

12. The multi dust-collecting apparatus as claimed in claim 11, wherein the backflow prevention member has an opening of a predetermine diameter to allow the vertical portion of the suction pipe to pass therethrough, and an air passing opening is formed between the backflow prevention member and the vertical portion.

13. The multi dust-collecting apparatus as claimed in claim 11, wherein the second dust-collector comprises:
a second housing forming an exterior contour of the second dust-collector, the horizontal portion of the suction pipe penetrating though a center portion of the second housing; and
a plurality of cyclones arranged along an inner circumference of the second housing to centrifugally separate minute dirt particles from the air flowing from the first dust-collector.

14. The multi dust-collecting apparatus as claimed in claim 13, wherein each cyclone of the plurality of cyclones comprises:
a cyclone chamber to centrifugally separate dirt particles from the air flowing from the first dust-collector;
a chamber wall disposed between the first and the second housings to form the cyclone chamber;
a second inlet to guide the air discharged from the first dust-collector towards the cyclone chamber therethrough; and
a second outlet to discharge the air separated from the dirt particles in the cyclone chamber to the outside.

15. The multi dust-collecting apparatus as claimed in claim 14, wherein the cover unit comprises:
a cover;
air inflow guide channels fluidly communicating with the first outlet of the first dust-collector and the second inlets of the cyclones;
air outflow guide channels fluidly communicating with the second outlets of the cyclones; and
an air discharge pipe disposed on the cover to collect the air discharged from the respective air outflow guide channels and discharge the collected air to the outside.

* * * * *